United States Patent
Redford et al.

(10) Patent No.: US 8,260,455 B2
(45) Date of Patent: Sep. 4, 2012

(54) ADDRESS LABEL RE-WORK STATION

(75) Inventors: Dale E. Redford, Grand Prairie, TX (US); Michael D. Carpenter, Arlington, TX (US); James M. Pippin, Keller, TX (US)

(73) Assignee: Siemens Industry, Inc., Alpharetta, GA (US)

( * ) Notice: Subject to any disclaimer, the term of this patent is extended or adjusted under 35 U.S.C. 154(b) by 462 days.

(21) Appl. No.: 12/630,158

(22) Filed: Dec. 3, 2009

(65) Prior Publication Data
US 2010/0145504 A1    Jun. 10, 2010

Related U.S. Application Data

(60) Provisional application No. 61/201,007, filed on Dec. 5, 2008.

(51) Int. Cl.
*G06F 7/00* (2006.01)
*B07C 5/00* (2006.01)
*B07C 7/00* (2006.01)
*G06K 9/00* (2006.01)
*G06K 9/03* (2006.01)

(52) U.S. Cl. ........ 700/230; 700/219; 700/218; 700/223; 700/227; 209/546; 209/630; 382/310; 382/101

(58) Field of Classification Search .................. None
See application file for complete search history.

(56) References Cited

U.S. PATENT DOCUMENTS

| 5,422,821 | A  |   | 6/1995 | Allen et al. |
| 5,794,789 | A  | * | 8/1998 | Payson et al. ............... 209/549 |
| 6,047,889 | A  |   | 4/2000 | Williams et al. |
| 6,577,749 | B1 |   | 6/2003 | Rosenbaum |
| 2002/0036160 | A1 | * | 3/2002 | Reed ........................... 209/546 |
| 2009/0110284 | A1 | * | 4/2009 | Lamprecht et al. ........... 382/187 |

FOREIGN PATENT DOCUMENTS

| WO | 2005115644 A2 | 12/2005 |
| WO | 2007135137 A1 | 11/2007 |

* cited by examiner

*Primary Examiner* — Gene Crawford
*Assistant Examiner* — Yolanda Jones

(57) ABSTRACT

An address label rework station according to the invention includes a conveyor which can simultaneously transport a series of spaced parcels along a conveyor path in a substantially horizontal stream. The station includes a camera, A work space, a microphone is usable by an operator in the work space, a targeting device directing a human operator in the work space. Station also includes a sensor system, a labeler and a printer to print shipping information. The station also includes a computer configured to receive and recognize image and voice data, generate a label with a recognized shipping address, and control the conveyer to apply a new label to the parcel by the labeler at the position selected using the targeting device.

12 Claims, 6 Drawing Sheets

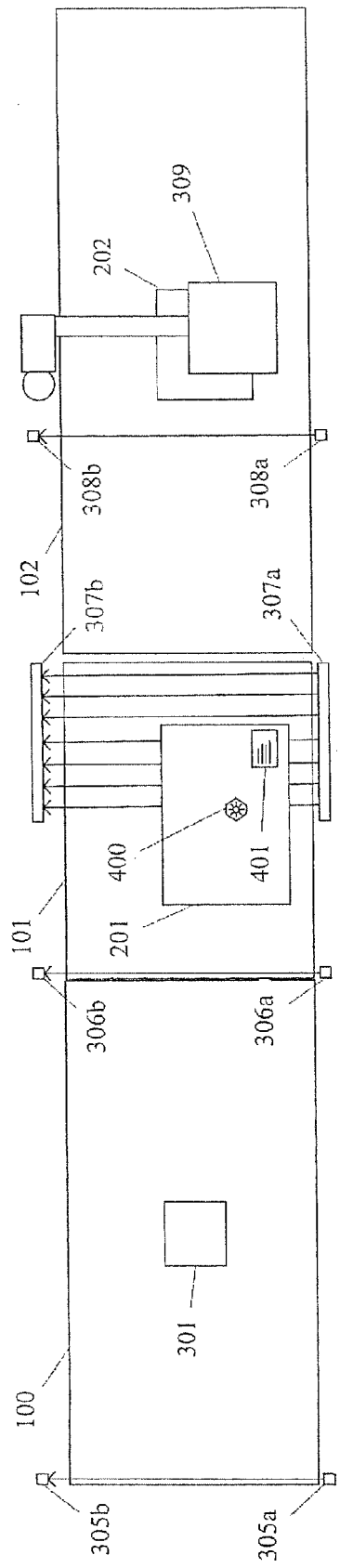
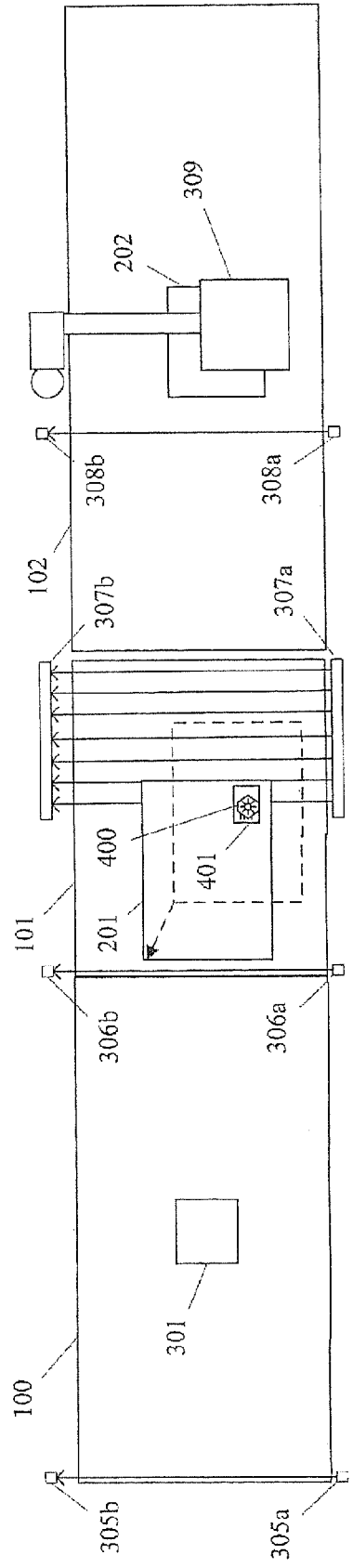
Figure 2
Figure 3

ADDRESS LABEL RE-WORK STATION

This application claims priority of U.S. provisional application No. 61/201,007, filed Dec. 5, 2008.

TECHNICAL FIELD

This invention relates to equipment and methods used in processing of three dimensional mail pieces, in particular parcels.

BACKGROUND OF THE INVENTION

In the process of sorting objects that have been mailed, some mail pieces will have addresses that cannot be fully read by existing Optical Character/Bar Code reading systems. One reason for the mail pieces to be unreadable is poor handwriting. In other instances, the address is legible but the object must be forwarded because the recipient has moved. In either case, it is often preferable to resolve the correct destination at once and apply a label to the object. See, in this connection, Allen et al. U.S. Pat. No. 5,422,821. Often it is important this label be placed such that it obscures the existing address information to avoid later ambiguity. In this manner the mail piece may be returned to an automation or manual processing stream then sorted and delivered efficiently.

Prior art workstations for manual entry of address information have an operator with a keyboard for data entry, a computer monitor to indicate results and a manual means of applying a label. In some cases the label is printed and the operator picks the label and places it on the object. In other implementations, the operator holds the mail piece in position for an automated label applicator. These prior art methods are inefficient because the operator is involved in each step of the process and events are sequential in that the operator keys the data, waits for the system result and label to print, then applies the label. Commonly, an operator's work pace will be less than 300 pieces per hour or 12 seconds per mail piece because of the embedded wait time. The present invention eliminates much of the wait time and improves the processing capability to double or triple the rate obtainable with the known process.

Thorsten, et al. United States Patent Application 20090110284, Apr. 30, 2009, describes character recognition on an object for automatic processing of the object in a processing system, where the object contains at least one character string of processing information, a character string spoken by an operator is processed by a speech recognition procedure to generate a candidate list containing at least one candidate corresponding to the operator-spoken character string. The candidate list and a digital image of an area containing the processing information are made available for an optical character recognition procedure. The OCR procedure is performed on the digital image in coordination with the candidate list to determine if a character string recognized by the OCR procedure performed on the digital image corresponds to a candidate in the candidate list. Any such corresponding candidate is outputted as the character string on the object.

SUMMARY OF THE INVENTION

An address label rework station according to the invention includes a conveyor which can simultaneously transport a series of spaced parcels along a conveyor path in a substantially horizontal stream. A camera is positioned to capture an image of a face of each parcel having an original address label thereon. A work space is provided for a human operator to manually position parcels on the conveyor. A microphone is usable by an operator in the work space. A targeting device includes an indicator directed to a location above the conveyor, which device directs a human operator in the work space that an existing label on a parcel be positioned on the conveyor so that the indicator targets the existing label. A sensor system detects the position of a parcel on the conveyor. A labeler is disposed to apply a label to a parcel on the conveyor at the position indicated by the targeting device. A printer is positioned to print shipping information on a label to be applied by the labeler. Labelers with built in printers are known in the art. A computer is configured to:

receive image data from the camera and receive voice data from the microphone, apply optical character resolution program logic to the image data;

apply voice recognition program logic to the voice data;

determine a shipping address from one or both of the image data and the voice data;

operate the printer to apply shipping information including the shipping address to a new label applied to the parcel by the labeler;

receive a sensor signal from the sensor system and operate the conveyor so that a parcel is conveyed past the targeting system and then past the labeler at a speed which allows application of the new label to the parcel by the labeler at the position selected using the targeting system.

The preferred targeting device is a light beam generator which directs a beam of light towards the upper surface of the conveyor. The light spot determines desired position in the x direction (in direction of transport). Y direction position does not change after initial placement until after the automatic labeler applies the new label.

In a process of the invention each component performs a step as described above. And other aspects of the invention are discussed below in the description which follows.

It is to be understood that terms used herein not otherwise defined should be given their meanings recognized in the postal sorting art, if applicable, not more general definitions found in dictionaries. Three dimensional object as used herein refers to an object of substantial height width and depth and would exclude thin flat objects such as letter mail and flats. The process of the invention is best applied to three dimensional parcels but could be used with thin objects such as flat mail. For purposes of the invention use of a computer may refer a single computer which performs all of the functions recited or multiple computers or processors or logic controllers which perform the same functions. These and other aspects of the invention are discussed below in the description which follows.

BRIEF DESCRIPTION OF THE DRAWING

In the accompanying drawing:

FIGS. 2 and 3 are plan views of the system shown in FIG. 1;

DETAILED DESCRIPTION

Figure 1:
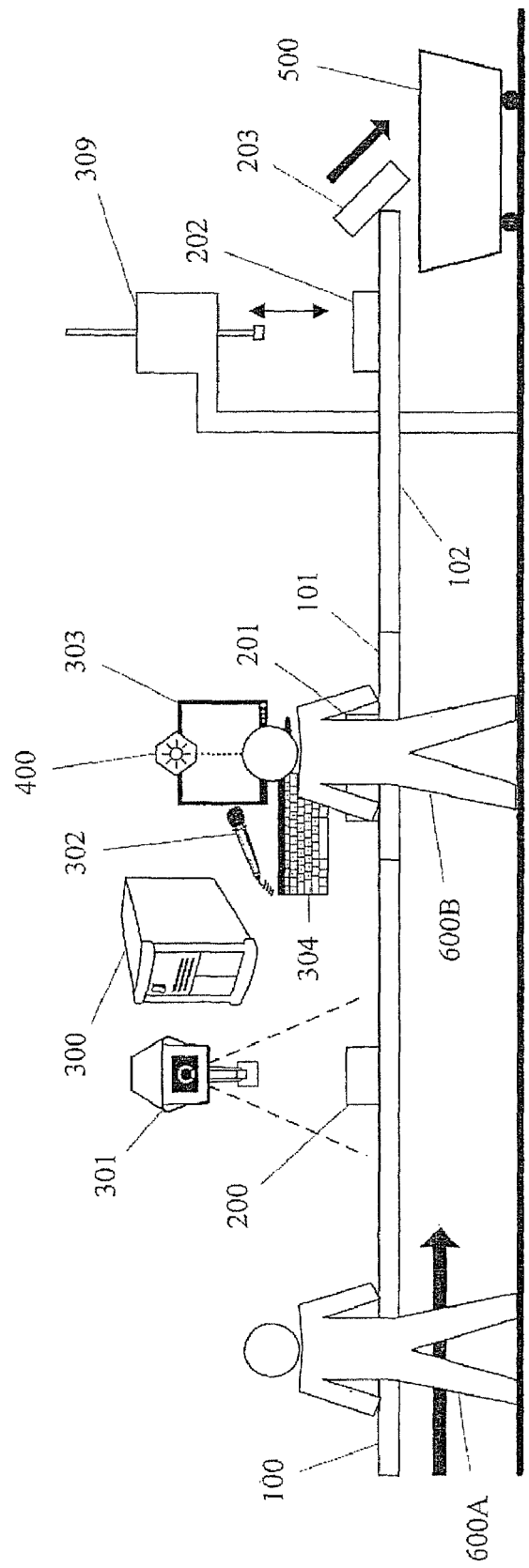
FIG. 1 is a schematic side view of a workstation according to the invention.

FIG. 1 is an example of a system that receives objects such as parcels from an orderly input source such as the rejects from an automation sorter, for example, a tilt tray or cross belt sorter. In this case, the objects are removed from one or more outlet bins of the sorter and manually faced with the address up and spaced on a belt such that an overhead camera can view each individual object address. The orderly flow could also be created manually by an operator 600A upstream facing and spacing the objects on the conveyor. "Facing" refers to a step of examining the outside of the parcel, determining which face the address information is on, and then placing the object with the address showing in the desired direction, e.g. face up for viewing with an overhead camera.

In FIG. 1, parcels 200-203 are faced and placed by operator 600A and received sequentially on input conveyor 100 and transported to the field of view of overhead camera 301. Conveyor 100 is preferably a horizontal belt conveyor in the form of a series of cascaded conveyor sections which can be operated separately as described hereafter. The camera 301 lifts a video overhead view image of the object (parcel) 200-203. Conveyor 100 is then reactivated and the parcel 200-203 is transported to a second conveyor 101. Camera 301 is a digital camera with a field of view that includes the location where the operator places the package, but a line scan camera can be used instead.

The parcel 200-203 is positioned on conveyor 101 in front of a second operator 600B and stopped. Stopping can be at operator's 600B's voice command as described further below, or other means such as a foot pedal that turns conveyor 101 on and off.

Operator 600B reads the address from the faced parcel (201 in the example of FIG. 1) into a microphone 302. A computer 300 receives the video data from camera 301 and audio data from microphone 302. One or more OCR processes are applied to the video data and voice recognition software is used on the audio data. Computer 300 then attempts to determine the correct address. Known OCR software determines a % confidence level for the decoding of the image data and a similar estimate is made by the voice recognition software. The process can then proceed by taking the better of the two results, or may apply additional resolution processes to the results. It is known in the art, for example, to use arbitration software to compare and resolve the results of different OCR address resolution processes. See for example Bruce et al. U.S. Patent Pub. No. 20020168090 Nov. 14, 2002. According to one aspect of the invention, computer 300 preferably applies a different kind of arbitration process to the voice recognition result and the scan data. The result may have a high enough level of confidence as determined by the arbitration process that it can be used without further review or data entry.

In the voice recognition step, the operator preferably pronounces the address data one letter (character) at a time. OCR arbitration routines such as mentioned in the foregoing application to Bruce et al. also recognize individual characters and determine a level of confidence in each. According to a preferred form of the present invention, arbitration is undertaken by comparing the confidence level of the voice recognition results and OCR results on a character by character basis. This can include taking the higher confidence level of the two results for a given character, provided that a minimum confidence level is met for the arbitrated result. If the minimum is not met, namely both the video and audio data individually and combined are insufficient, an indication is shown on monitor 303 and the operator 600B then keys the data using keyboard 304.

Computer 300 uses predetermined rules to deal with problematic characters. For example depending on the diction of the operator, the letter "d" may be mistaken for an "e" by the voice recognition software. In such situations the OCR result may be used instead due to its higher confidence level. Context sensitive routines may also be applied in such situations, e.g. spell checker results as applied to OCR results and a lookup of valid destination points, i.e. a step of ensuring that the address read by the operator or decoded by OCR is a destination known to the USPS postal database of valid delivery addresses. If a mail forwarding request is in effect for the recipient determined from the original label, such as caused by a change of address of the intended recipient of the parcel 200-203, the system looks up the forwarding address in a change of address database and the forwarding address is used to generate the new label as described hereafter.

Once the result is determined, computer 300 activates a targeting device such as a light 400. A plumb line (pointer hanging vertically on a string) could also be used. Light 400 directs a beam of light vertically toward the upper surface of conveyor 101 at a predetermined location. Operator 600B then positions parcel 201 to place the desired label location in the field of the target light 400 projection. Once parcel 201 has been positioned correctly, operator 600 speaks a predefined trigger word, such as "go", into microphone 302, or hits a switch or button, and the conveyor 101 is turned on to carry the parcel to an adjacent downstream conveyor section 102. Conveyor 102 carries the parcel to a position under an automatic label printer/applicator 309 such that the position identified by the target light 400 is directly under the applicator 309. Applicator 309 can be of any of several types known in the art. In this embodiment it is a stamp labeler such as a Panther CUB Label Applicator. This and other similar label applicators have an arm which moves down into contact with the surface of the parcel to be labeled.

As described below, the speed at which the applicator operates has to be coordinated with conveyor speed and photocell data indicating leading edge arrival of packages 200-203.

Achieving proper positioning depends on the accuracy of the targeting step i.e., placement of the label location at the location of target light 400. It also depends also on keeping the position of the mail piece 200-203 relative to conveyors 101, 102 the same as it is carried by the conveyors 101, 102. In other words, parcels 200-203 are not allowed to slide along the surface of either conveyor, which might cause the labeler to print at the wrong position. For this purpose one or both of conveyors 101 and 102 can use a vacuum belt that holds items in position as they are conveyed, i.e. preventing relative movement between the conveyor and parcel.

Conveyor sections 101 and 102 use sensors of a sensor system to detect parcels 200-203 moving by Photo eye type sensors, 305b, 306b and 308b receive light from emitters 305a, 306a and 308a on the opposite side of the conveyor path respectively. Objects passing through the light beams cause the sensor to change state indicating the presence of an object to the system. This is just one of many means to detect an item and one skilled in the art will recognize many other possibilities for item presence detection such as reflective sensors, proximity detectors, and the like.

FIG. 2 shows parcel 201 as it is first presented to the operator 600B. FIG. 3 shows how parcel 201 has been repositioned by operator 600B to cause the existing label at location 401 to be in the position where the new label will be placed as indicated by target light 400. A rectangular array of photo sensors 307b receive light from an aligned array of emitters 307a. Once the parcel 201 has been repositioned, the array of sensors 307b is used to determine the relative distance from the leading edge of the parcel 201 to the target light 400 position. The spatial relationship of the sensors 307a, 307b to the target 400 is predetermined, i.e. determined when the system is first set up. This comprises for example the distance from the center of target light 400 to a line representing a photocell beam between sensors 307a, 307b. For this purpose it is sufficient to use single rows of sensors 307a and 307b on each side of conveyor 102. However, if multiple rows are used at different heights, then sensors 307a and 307b can be used to measure the approximate height of a parcel 200-203.

In the process of the invention, height detection is useful when the mail pieces 200-203 come in a variety of thicknesses/heights. As stamp type automated labelers typically operate, movement of the label to the package is at a constant velocity profile. The timing of the trigger signal to the labeler is a function not only of the velocity of the package in the direction of travel on the transport conveyor 102, but also the height of the package. The photo cell used to trigger the labeler must be positioned sufficiently upstream from the labeler such that the labeler can travel the distance down to the shortest package in less than the travel time of the package 200-203 to the label point from the photocell. The package height is measured and the controller calculates the delay from the package interrupting the trigger photo cell that trigger the labeler (308a, 308b) based on the conveyor transport velocity and height of the package. Passage of a parcel 200-203 through the last pair of sensors 308a, 308b starts the labeling cycle.

Figure 4:
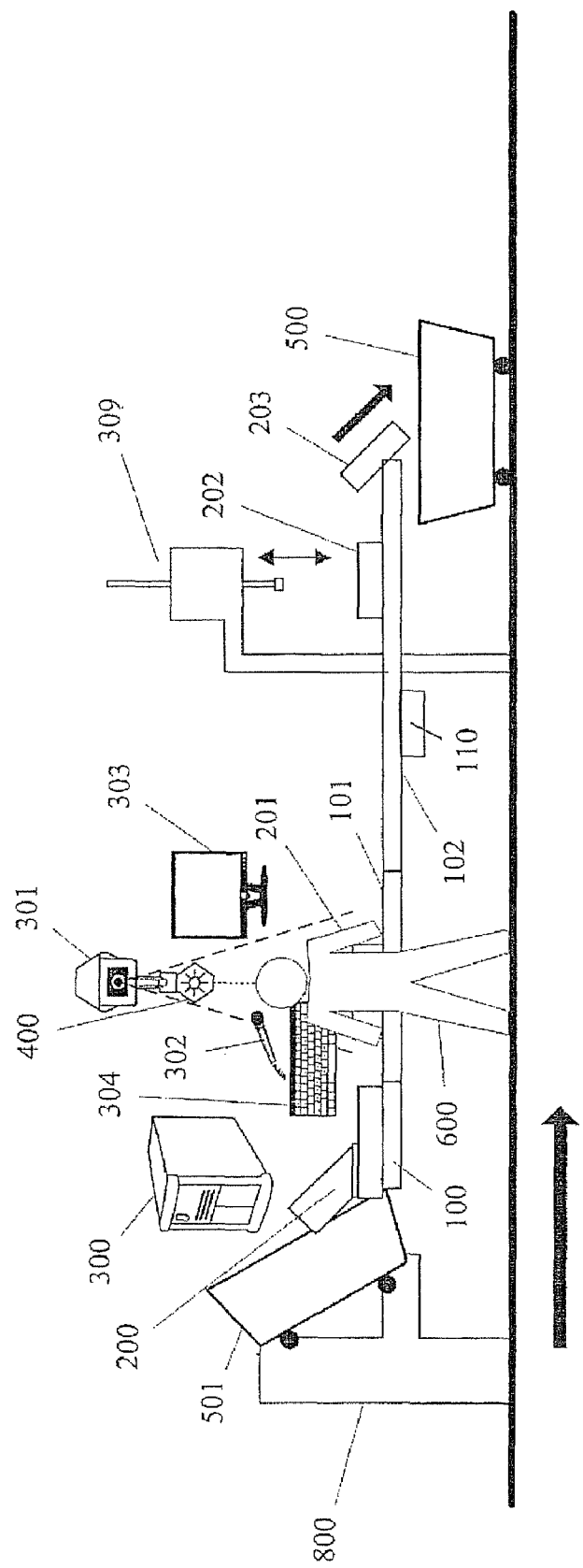
FIG. 4 is a diagram of control connections for the system shown in FIGS. 1-3.

FIG. 4 shows is an alternate embodiment applicable to initial loading and placement of packages 200-203. Parcels 200-203 are received in a tray or hamper 501. The hamper is loaded onto a dumper 800, hamper 501 is tilted up and elevated by dumper 800 such that operator 600 can easily remove parcels from the hamper. Camera 301 is located to be directly over the space in front of operator 600 who picks up parcel 201 and places it with the label side up in the field of view of camera 301. Once parcel 201 has been placed, operation of the system continues as in the system of FIG. 1. The operator 600 reads the label, and computer 300 resolves the image using the video data from camera 301 and audio data from microphone 302. Computer 300 turns on light 400 and the operator 600 repositions the parcel 201 to place the desired label location in the image projected by target light 400. The parcel continues on, the label is applied by printer/applicator 309, and the parcel is sent to a wheeled hamper or basket 500.

Another embodiment according to the invention adds an inline scale 100 that weighs the parcel at that location as it passes. The weight is used to determine the postage when the new label is applied so that the postage can be printed on the new label. This can be used as a check on the weight provided by the sender as printed on the original label. The inline scale can be located as part of conveyor 102 between the position of operator 600 or 600B and labeler 309. A step of printing a postage marking on the new label can be performed at labeler 309.

In the preceding embodiment the first operator 600A is not used. Instead a single operator 600 places the item and creates the stream of parcels with the assistance of dumper 800, then positions each parcel for labeling. This illustrates that functions described as performed by a human operator could be done by a single operator or two or more operators as needed.

Figure 5:
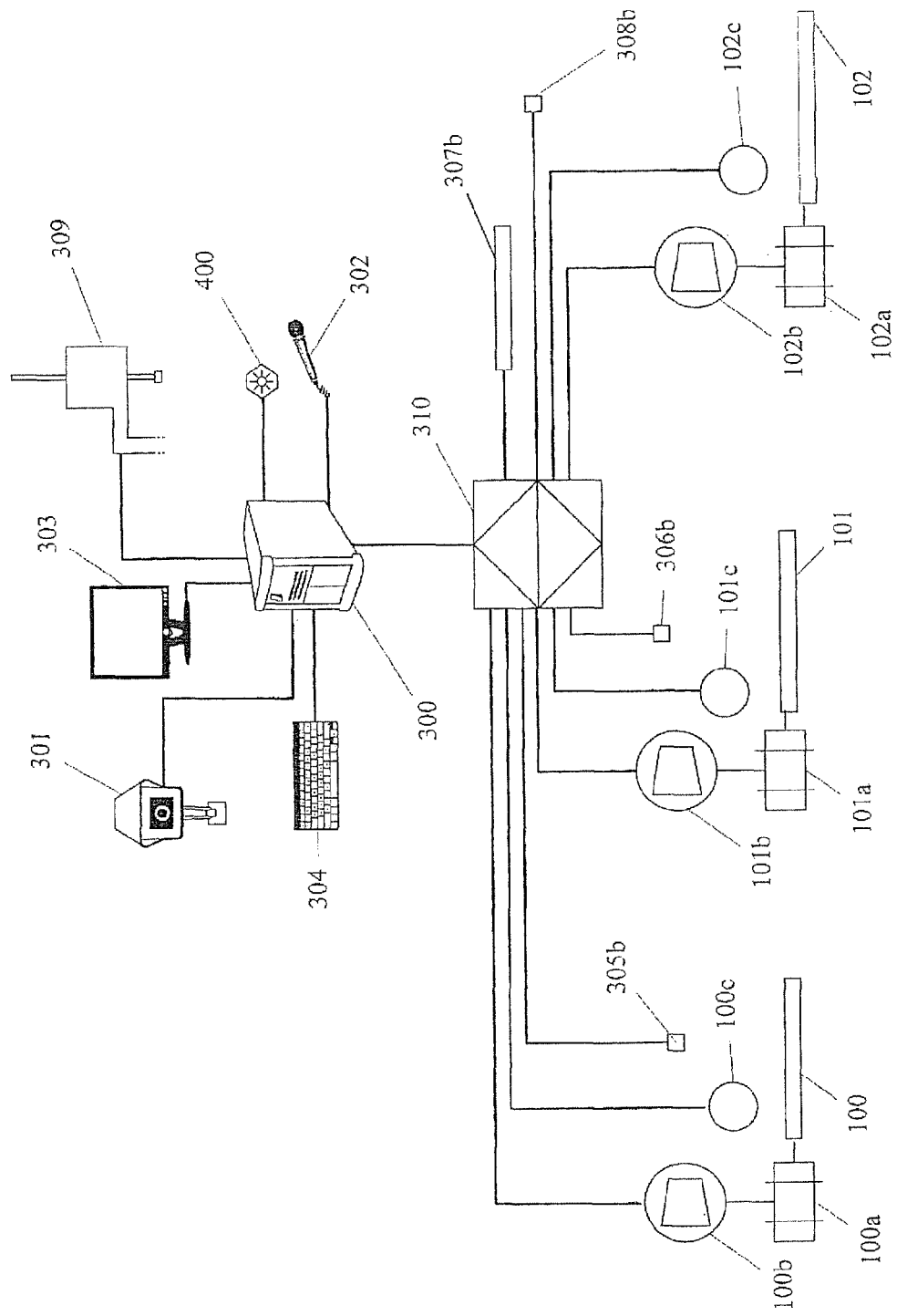
FIG. 5 is a block diagram of the system shown in FIG. 1 with the relative positions of devices and interconnections.

Referring to FIG. 5, computer 300 is connected directly to the keyboard 304, camera 301, microphone 302, monitor 303, target light 400 and label/printer applicator 309. Computer 300 also connects to a PLC 310 that controls the conveyor system. Each conveyor, 100, 101, 102, has a motor 100a, 101a and 102a respectively, a variable frequency drive 100b, 101b and 102b respectively, and rotary shaft encoder 100c, 101c, and 102c, respectively. Photo sensors 305b, 306b and 308b connect to PLC 310 as does light bar sensors 307b. Computer 300 is programmed to operate the system as described herein.

SYSTEM OPERATION

Figure 6:
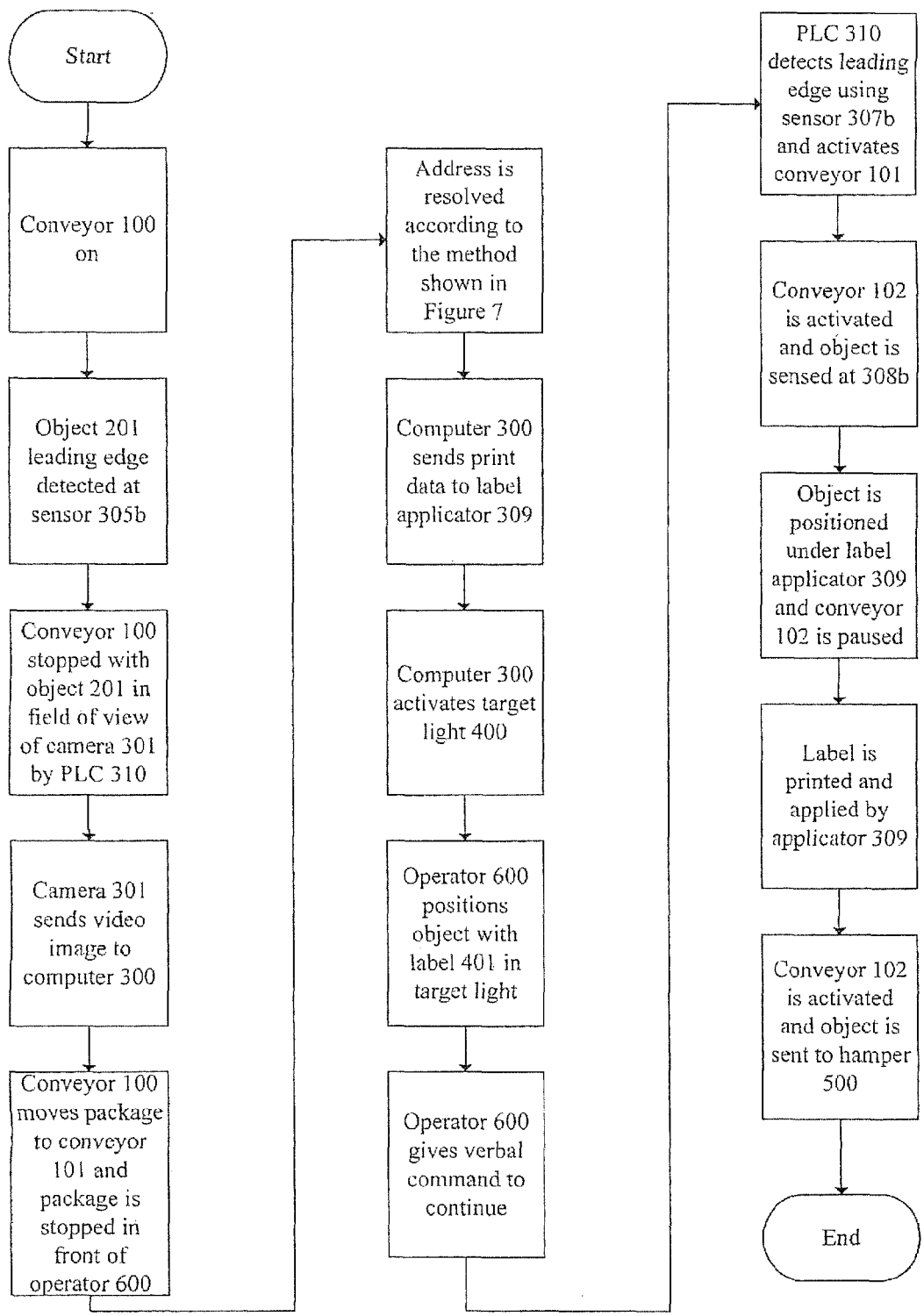
FIG. 6 is a flow chart showing the overall processing steps for the system of FIG. 1.

Normal product flow is shown in FIG. 6. Parcels enter the system on conveyor 100 and are detected by sensor 305b when the photoeye beam is interrupted. Using encoder 100c the PLC 310 tracks the parcel 200-203 and stops it in the field of view of camera 301. Camera 301 lifts a video image and sends it to computer 300.

The parcel 200-203 is moved to conveyor 101 where the leading edge is detected by sensor 306b and encoder 101c is used to track the parcel 200-203 until it is directly in front of operator 600 where conveyor 101 is halted. The destination address of the parcel is resolved by the method shown in FIG. 7 and described hereafter. Not shown is removal of parcels as rejects for which the address cannot be resolved. The computer 300 sends the address data to the printer/applicator 309 and the label is printed prior to the parcel 200-203 arriving at the label application position.

While the parcel 200-203 is positioned in front of operator 600, target light 400 is activated by computer 300 and the operator repositions the parcel to position the desired label location 401 on the parcel in the projected image from light 400. The operator speaks the command to continue and the PLC 310 determines the relative distance from the leading edge to the desired label position using edge sensor array 307b. The PLC 310 then re-activates conveyor 101.

The parcel 200-203 is moved to conveyor 102 where the leading edge is detected by sensor 308b, and encoder 102c is used to track the parcel until it is under the label printer/applicator 309 and conveyor 102 is halted. The applicator 309 is activated and the label previously printed with address data from computer 300 is applied to the parcel. Conveyor 102 is restarted and the parcel is driven into hamper 500. One skilled in the art will recognize the parcel could be returned to further processing such as sorting on a cross-belt sorter with a conveyor system continuing on from conveyor 102 rather than being dumped into a hamper.

An advantage of the current invention over prior art is the operator involvement is limited to positioning the parcel for labeling and, if necessary, providing input for address resolution. Effectively, the video lift, parcel positioning and label application can happen in parallel operations with 3 parcels simultaneously in the current invention as opposed to sequential one object-at-a-time operations in the prior art process. As a result, productivity of the operator is approximately tripled as compared to the prior art.

Figure 7:
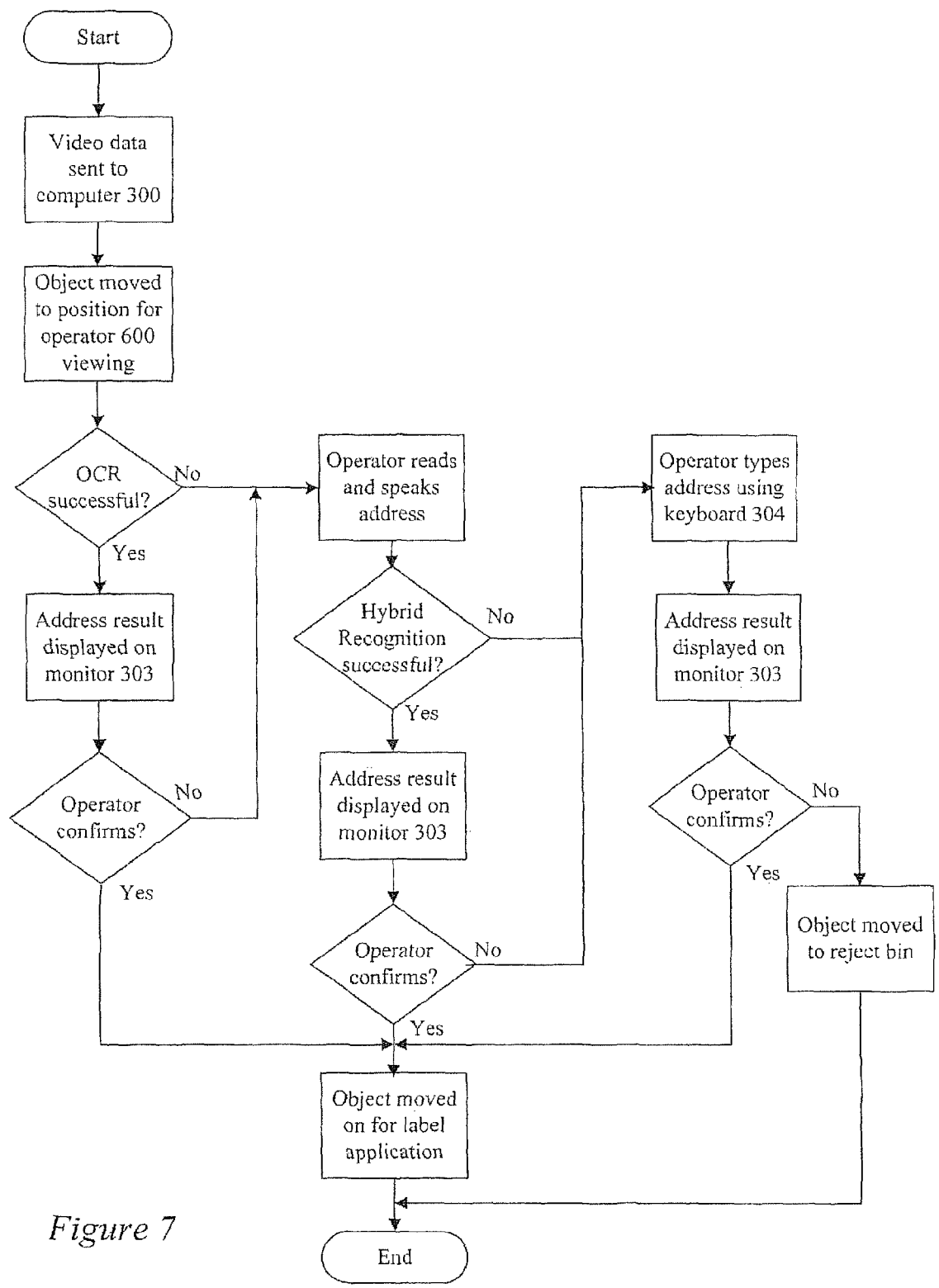
FIG. 7 is a flow chart showing the processing steps to resolve the address for the system of FIG. 1.

In the system shown in FIG. 4, mail arrives at the system in a hamper or other bulk conveyance and is randomly faced. Operator 600 must face the object to position the address label on the top surface. The address resolution is accomplished as shown in FIG. 7 with the exception the operator may read the address into the microphone concurrent with the video lift and OCR processing. Once the address has been resolved the operation continues as described above and in FIG. 6.

The alternate embodiment of FIG. 4 may be more effective for standalone systems with objects buffered in bulk containers. In an environment with multiple rework stations a single operator could face objects and place on input conveyors for as many as 5 rework stations of the type shown in FIG. 1 and the overall efficiency is greater than each rework station operator facing the objects as shown in the alternate embodiment of FIG. 4. The operator efficiency for the alternate embodiment will be less than the system shown in FIG. 1 but it will still exceed the prior art by at least a factor of two. In the alternate embodiment the edge detection device consisting of emitter array 307a and receiver array 307b could be eliminated by using the video image from camera 301 to determine the location of the package relative to the light target 400. Other means such as a side view camera could be used to determine parcel height.

FIG. 7 is a flowchart of an address resolution process that is executed as a part of the overall process described above. If the OCR has processed the image and resolved the address with an acceptable level of correlation, the address is displayed on the monitor 303. Operator 600 looks at the address on the object and compares it to the OCR result. The operator then either confirms the OCR result by speaking a predetermined word such as "yes" or reads the correct address into the microphone.

If the operator 600 reads the address, software on the computer will attempt to resolve the address using a hybrid-voice method such as described in Rosenbaum U.S. Pat. No. 6,577,749, the contents of which are incorporated by reference herein, that combines video and audio data in a recognition algorithm. If the recognition algorithm resolves the address with an acceptable correlation value, the result is displayed on the screen. The operator compares the result with the address on the object. If the data matches, the operator confirms the match and positions the object for labeling. If the result does not match, the operator can attempt to enter the address data using the keyboard. In addition to resolving the address the recognition software also may validate the result against a database of known valid addresses. In the case where even the keyed data does not result in a valid destination match the operator rejects the object and takes it out of the system for further exception processing.

Concurrent with the positioning of parcel 202, the label printer/applicator 309 has printed the label with data received from computer 300. Printer/applicator 309 applies the label, conveyor 102 is reactivated, and parcel 203 falls from the end of conveyor 103 into a hamper or other receptacle 500. Applicator 309 may be one of a number of known types. A tamp applicator has a movable foot that presses the label against the surface it is applied to. The pressure of application is adjustable. A label jet blower could also be used. This type of labeler holds the label with an applied vacuum and then blows it off and into the desired position.

The labels are supplied on a roll of wax paper. The labeler bends the wax paper backing and then peels and holds the label.

The method of the invention is effective for parcels or objects of different heights as long as none exceed a predetermined maximum height. It is preferred to operate the conveyor and labeler so that labels can be printed and applied "on the fly", that is, while the conveyor and parcel continue moving, to improve throughput.

Although several embodiments of the present invention have been described in the foregoing detailed description and illustrated in the accompanying drawings, it will be understood by those skilled in the art that the invention is not limited to the embodiments disclosed but is capable of numerous rearrangements, substitutions and modifications without departing from the spirit of the invention. Such modifications are within the scope of the invention as expressed in the appended claims.

The invention claimed is:

1. An address label rework station, comprising:
a conveyor which can simultaneously transport a series of spaced parcels along a conveyor path in a substantially horizontal stream;
a camera positioned to capture an image of a face of each parcel having an original address label thereon;
a work space for a human operator to manually position parcels on the conveyor;
a microphone usable by an operator in the work space;
a targeting device including an indicator directed to a location above the conveyor, which device directs a human operator in the work space that an existing label on a parcel be positioned on the conveyor so that the indicator targets the existing label;
a sensor system which detects the position of a parcel on the conveyor;
a labeler disposed to apply a label to a parcel on the conveyor at the position indicated by the targeting device;
a printer positioned to print shipping information on a label to be applied by the labeler;
a computer configured to receive image data from the camera and receive voice data from the microphone;
apply optical character resolution program logic to the image data;
apply voice recognition program logic to the voice data;
determine a shipping address from one or both of the image data and the voice data;
operate the printer to apply shipping information including the shipping address to a new label applied to the parcel by the labeler; and
receive a sensor signal from the sensor system and operate the conveyor so that a parcel is conveyed past the targeting system and then past the labeler at a speed which allows application of the new label to the parcel by the labeler at the position selected using the targeting system.

2. The system of claim 1, wherein the targeting device comprises a light beam generator which directs a beam of light towards the upper surface of the conveyor.

3. The system of claim 2, wherein the sensor system includes photocells positioned to detect passage of a leading end of a parcel on the conveyor past spaced locations along the conveyor path.

4. The system of claim 1, wherein the sensor system includes one or more sensors deployed to measure the height of parcels moving along the conveyor before reaching a labeling position proximate the labeler; and
the computer is programmed to operate the labeler to lower a labeling applicator into contact with a parcel on the conveyor below the labeler, wherein the speed of movement of the labeling applicator is computed based on conveyor speed at the location of the labeler and on the height of the parcel, such that the applicator applies the label printed with shipping information for that parcel indicated by the computer.

5. The system of claim 1, wherein the camera is located at a fixed position near the conveyor.

6. The system of claim 1, wherein comprising a computer programmed to receive manual corrections to the address data entered by an operator.

7. The system of claim 1, an inline scale which is part of the conveyor and which is connected to the computer which is programmed to cause the labeler to print one or both of parcel weight and postage based on the weight measured by the scale.

8. A process for relabeling a parcel, comprising:
- (a) manually placing a series of spaced parcels on a conveyor with an original address label of each parcel facing an image lift camera;
- (b) transporting the series of spaced parcels along a conveyor path of the conveyor in a substantially horizontal stream;
- (c) capturing an image of a face of each parcel having an original address label thereon with the camera;
- (d) receiving voice data with a microphone from a human operator reading the original address label;
- (e) determining a destination shipping address for each parcel with a computer programmed to process the image data with optical character resolution program logic and process the voice data with voice recognition program logic;
- (f) manually repositioning each parcel as it passes on the conveyor beneath a targeting device including an indicator directed toward the upper surface of the conveyor, wherein the parcel is repositioned so that the indicator is aligned with the location of the original destination label and is offset from a leading edge of the parcel by a predetermined distance;
- (g) transporting each parcel further with the conveyor while tracking with a sensor system the position of a leading edge of the parcel;
- (h) printing the shipping information on a new label which information includes destination information based on one or both of the voice data and the imaging data;
- (i) determining with a computer which may be the same or different from the computer used in step (e) when the position of the original label is in a position for relabeling with an automatic labeler positioned to apply a label to a parcel on the conveyor; and
- (j) operating the automatic labeler disposed to apply the new label to each parcel on the conveyor at the position of the original label.

9. The process of claim 8, wherein the new label covers and substantially conceals the original address label.

10. The process of claim 8, wherein steps (c) (f) and (j) are carried out simultaneously on three parcels.

11. The process of claim 8, step (i) further comprises transporting the parcel by the predetermined distance and using the sensor system to determine when the leading edge of the parcel has reached a position at which step (j) begins.

12. The process of claim 8, further comprising weighing the parcel on an inline scale which is part of the conveyor, and printing the parcel weight or postage determined from the parcel weight on the new label.

* * * * *